US012627108B2

(12) United States Patent
College

(10) Patent No.: US 12,627,108 B2
(45) Date of Patent: May 12, 2026

(54) WIRE PROCESSING DEVICE

(71) Applicant: TE Connectivity Solutions GmbH, Schaffhausen (CH)

(72) Inventor: David Alan College, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 725 days.

(21) Appl. No.: 17/962,027

(22) Filed: Oct. 7, 2022

(65) Prior Publication Data

US 2024/0120696 A1 Apr. 11, 2024

(51) Int. Cl.
*H01R 43/052* (2006.01)
*H01R 43/28* (2006.01)

(52) U.S. Cl.
CPC ........... *H01R 43/052* (2013.01); *H01R 43/28* (2013.01)

(58) Field of Classification Search
CPC .... H01R 43/052; H01R 43/28; H01R 43/048; H01R 43/027
See application file for complete search history.

(56) References Cited

U.S. PATENT DOCUMENTS 4,183,383 A * 1/1980 Gudmestad ............ H01R 43/28 29/562
4,194,281 A * 3/1980 Gudmestad .......... H02G 1/1292 29/748
4,793,038 A * 12/1988 Guerout ................. H01R 43/01 29/564.6
4,899,441 A * 2/1990 Ricard ................. H01R 43/048 29/863
4,976,294 A * 12/1990 Kudo ..................... H01R 43/28 29/564.6
5,896,644 A * 4/1999 Lucenta ................. H01R 43/28 29/749
10,903,631 B2 * 1/2021 Wicki ...................... H02G 1/14
2001/0000367 A1 * 4/2001 Conte .................... H01R 43/28 29/868
2003/0126955 A1 * 7/2003 Hartranft ................. B25G 1/10 81/9.4
2005/0097939 A1 * 5/2005 Chien .................... H01R 43/28 72/409.08
2017/0294752 A1 * 10/2017 Lin ...................... H01R 43/027
2020/0365297 A1 * 11/2020 Herrmann .......... H01B 13/0221
2023/0099847 A1 * 3/2023 Yang ...................... H01R 43/28 29/759

(Continued)

FOREIGN PATENT DOCUMENTS

CN 102948022 A 2/2013
CN 105551689 A1 5/2016

(Continued)

OTHER PUBLICATIONS

Translation of DE-102022112025-B3 (Year: 2023).*

(Continued)

*Primary Examiner* — Jeffrey T Carley

(57) ABSTRACT

A wire holding device comprises a base and a clamping assembly. The clamping assembly includes a first gripper attached to the base and adapted to grip a first wire of a cable, and a second gripper adapted to grip a second wire of the cable. The second gripper is movable relative to, and operable independently of, the first gripper.

12 Claims, 8 Drawing Sheets

(56) References Cited

U.S. PATENT DOCUMENTS

2023/0230728 A1* 7/2023 Eggiman ................ H01R 43/20
140/149

FOREIGN PATENT DOCUMENTS

| | | | | | |
|---|---|---|---|---|---|
| DE | 102022112025 | B3 * | 10/2023 | ............. | H01R 43/28 |
| JP | 2008-177029 | A | 7/2008 | | |
| JP | 2016-085973 | A | 5/2016 | | |
| JP | 2020-537862 | A | 12/2020 | | |
| WO | 2011158390 | A1 | 12/2011 | | |
| WO | WO-2017159604 | A1 * | 9/2017 | ........... | H02G 1/1248 |
| WO | 201977429 | A | 4/2019 | | |

OTHER PUBLICATIONS

Translation of WO-2017159604-A1 (Year: 2017).*

Extended European Search Report, EP 24191033 International Filing Date Oct. 22, 2024.

European Search Report, International App. 23201803.6-1201 International Filing Date Feb. 22, 2024.

Japanese Office Action dated May 7, 2025 JP Application No. 2023-173348.

Japanese 2nd Office Action, JP 2023-173348 International Filing Date Oct. 7, 2022.

* cited by examiner

WIRE PROCESSING DEVICE

FIELD OF THE INVENTION

The present invention relates to the processing of wires or cables and associated terminals, and more specifically, to an improved system for applying terminals to wires of multi-wire cables, such as twisted pair cables.

BACKGROUND

Crimping or terminating systems for securing a terminal onto an element, such as an electrical conductor, typically include an applicator configured to feed a strip of terminals from a reel into position for crimping onto the conductor, and more specifically into a position above a lower crimping tool or die. Once the terminal is in place, an end of a wire or cable to be terminated is fed into position above or within the terminal. The terminal may be separated from the strip of terminals using a shear depressor attached to the movable end of an applicator ram used to drive an upper crimping die. As the applicator ram is moved, the depressor engages with a passive terminal shear or shear tool which shears the terminal from the strip just after the terminal is captured in the crimping tooling.

While effective for use with single wires, the above-described arrangement is not well-suited for use with multi-wire cables, such as twisted pair cables. Specifically, in multi-wire cable applications, the wire ends may only extend beyond the cable (e.g., its jacket) a relatively short distance due to the requirements of the final terminated assemblies. This creates difficulty in placing the individual ends within the applicator during crimping operations. Further problems arise due to requirements that the pair of discrete wires must remain in close proximity to each other to prevent signal noise. Specifically, in the above-described crimping process, the pair of wires may be pre-formed into a shape that creates enough space for the crimp tooling. This separation, however, is greater than the final spacing in the connector and greater than the allowable spacing between the wires for signal integrity. Thus, the wires need to be reformed after crimping to locate them in closer proximity to each other. This forming and reforming process may result in length discrepancy between the wire pair or internal stresses causing the wires to flex too far apart. Further, the formed wires are not individually supported or controlled during crimping since the gripping occurs on the cable jacket behind the formed wires. Depending on the stiffness of the wire, drooping may occur which may affect the repeatability of accurate wire placement within the terminal.

Improved systems and methods addressing these deficiencies are desired.

SUMMARY

In one embodiment of the present disclosure, a wire holding device comprises a base and a clamping assembly. The clamping assembly includes a first gripper attached to the base and adapted to grip a first wire of a cable, and a second gripper adapted to grip a second wire of the cable. The second gripper is movable relative to, and operable independently of, the first gripper.

BRIEF DESCRIPTION OF THE DRAWINGS

The invention will now be described by way of example with reference to the accompanying Figures, of which.

DETAILED DESCRIPTION OF THE EMBODIMENTS

Figure 1:
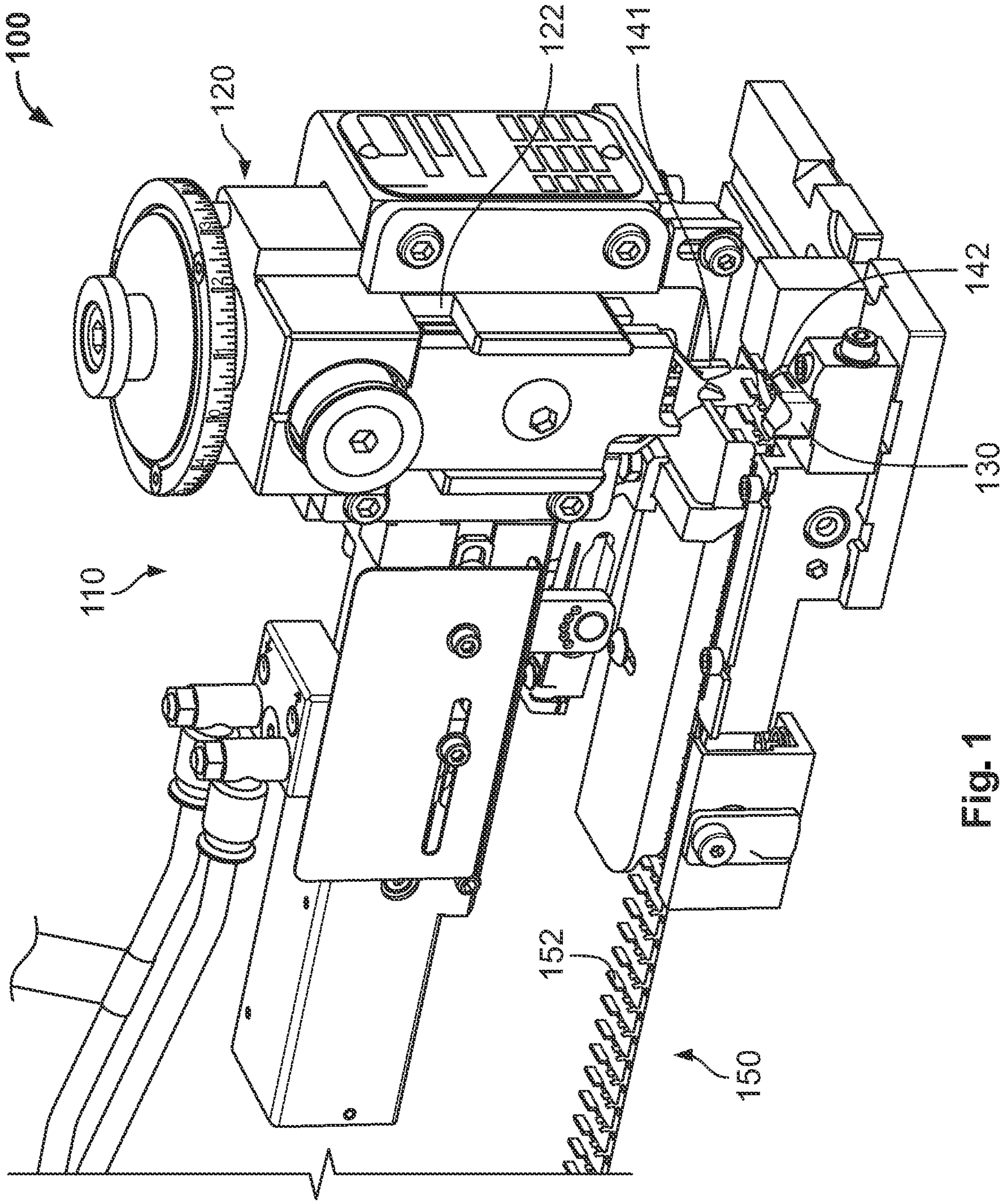
FIG. 1 is a front perspective view of a terminal applicator useful for describing embodiments of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of the present disclosure include a wire positioning device adapted to accurately position individual wires of a multi-wire cable (e.g., a twisted pair cable) relative to a cable termination system. The device includes a clamping assembly including a pair of clamps or grippers, with each gripper adapted to independently grip and position a wire of a cable for crimping. The assembly is movable such that each wire may be positioned in three dimensions. In this way, individual wires of the cable may be positioned accurately relative to a terminal prior to a fixing operation, such as crimping. The grippers may engage with and control each wire between the wire breakout from a cable jacket and the crimping location.

In one embodiment, a given wire is rotatable 22.5 degrees about an axis transverse to an axis of the cable, while the other wire of the cable is held generally straight or axially for crimping. This rotation provides the needed clearance for the crimp tooling. The device can be indexed to allow location of the straight wire in front of the crimp tooling. In one embodiment, the indexing is programmable into an associated system, and can be altered depending on the application. Likewise, the system includes additional programmable adjustments, such as in the vertical and axial directions of the wire/terminal to facilitate proper wire placement prior to crimping. Optionally, the positioning device, including its three-axis movement, can be used to locate the wires for other processing operations, such as stripping and trimming.

Figure 2:
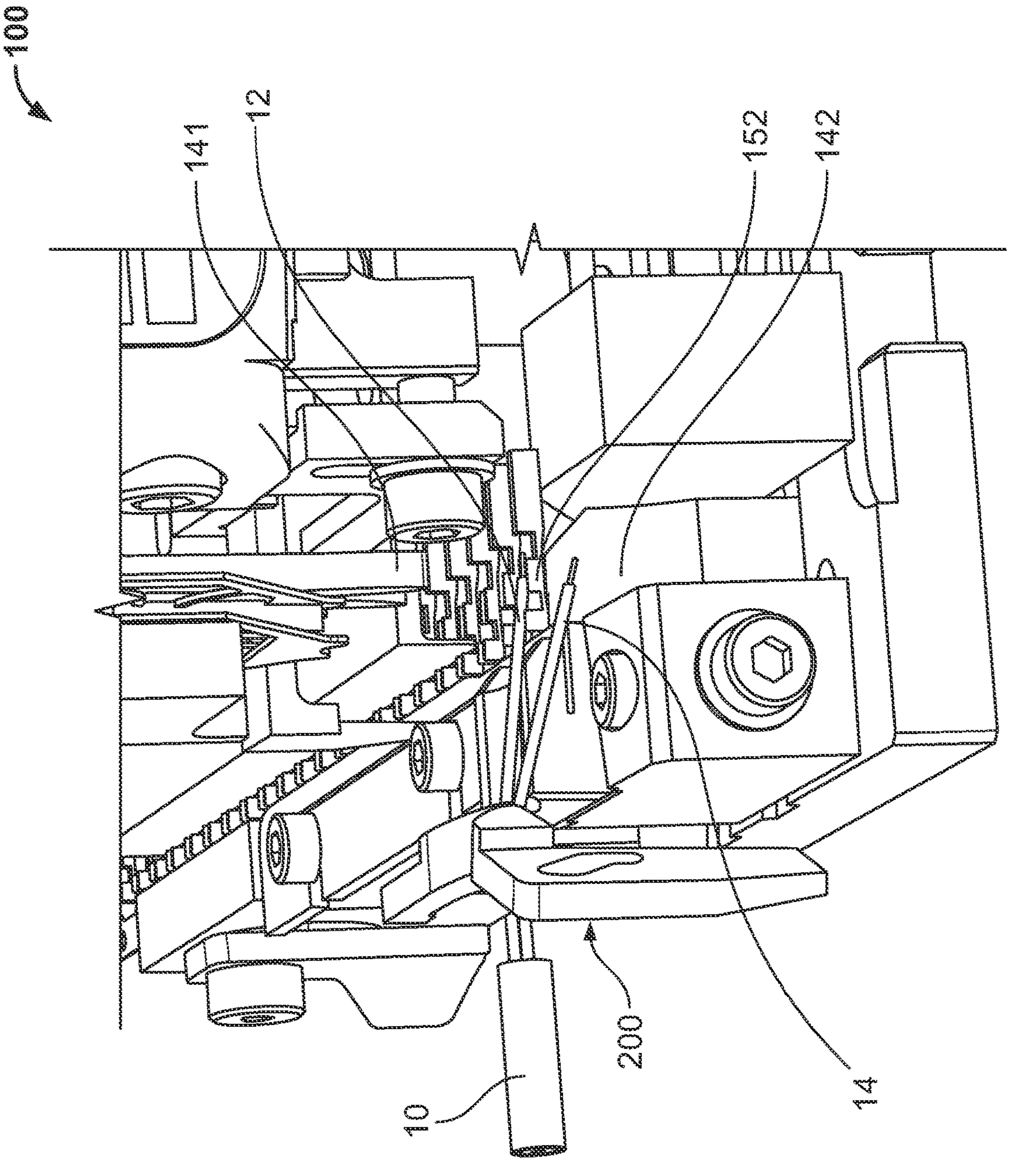
FIG. 2 is a side perspective view of the terminal applicator of FIG. 1 including a portion of a wire positioning device according to an embodiment of the present disclosure.
Figure 3A:
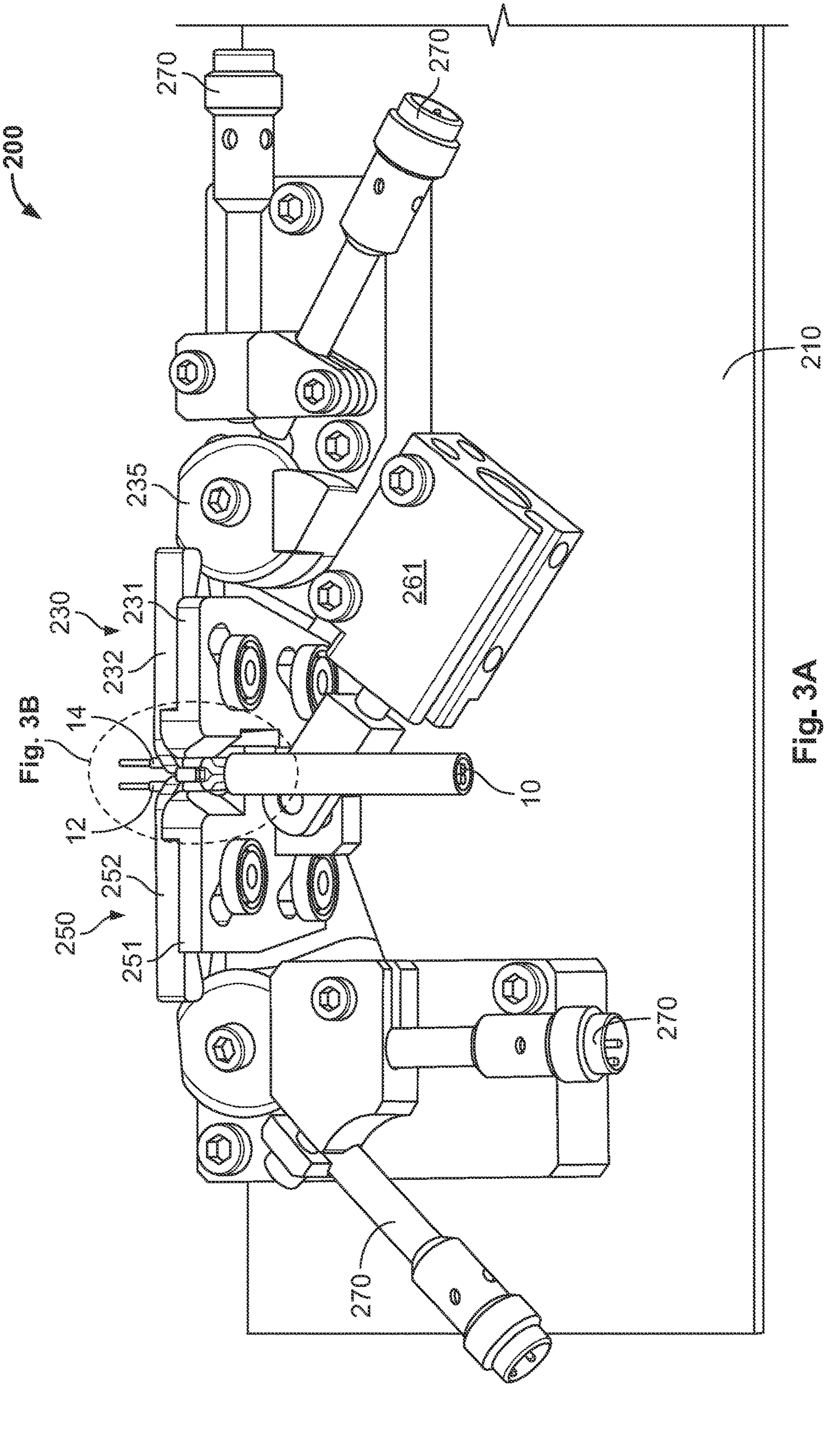
FIG. 3A is a top perspective view of a wire positioning device according to an embodiment of the present disclosure.
Figure 3B:
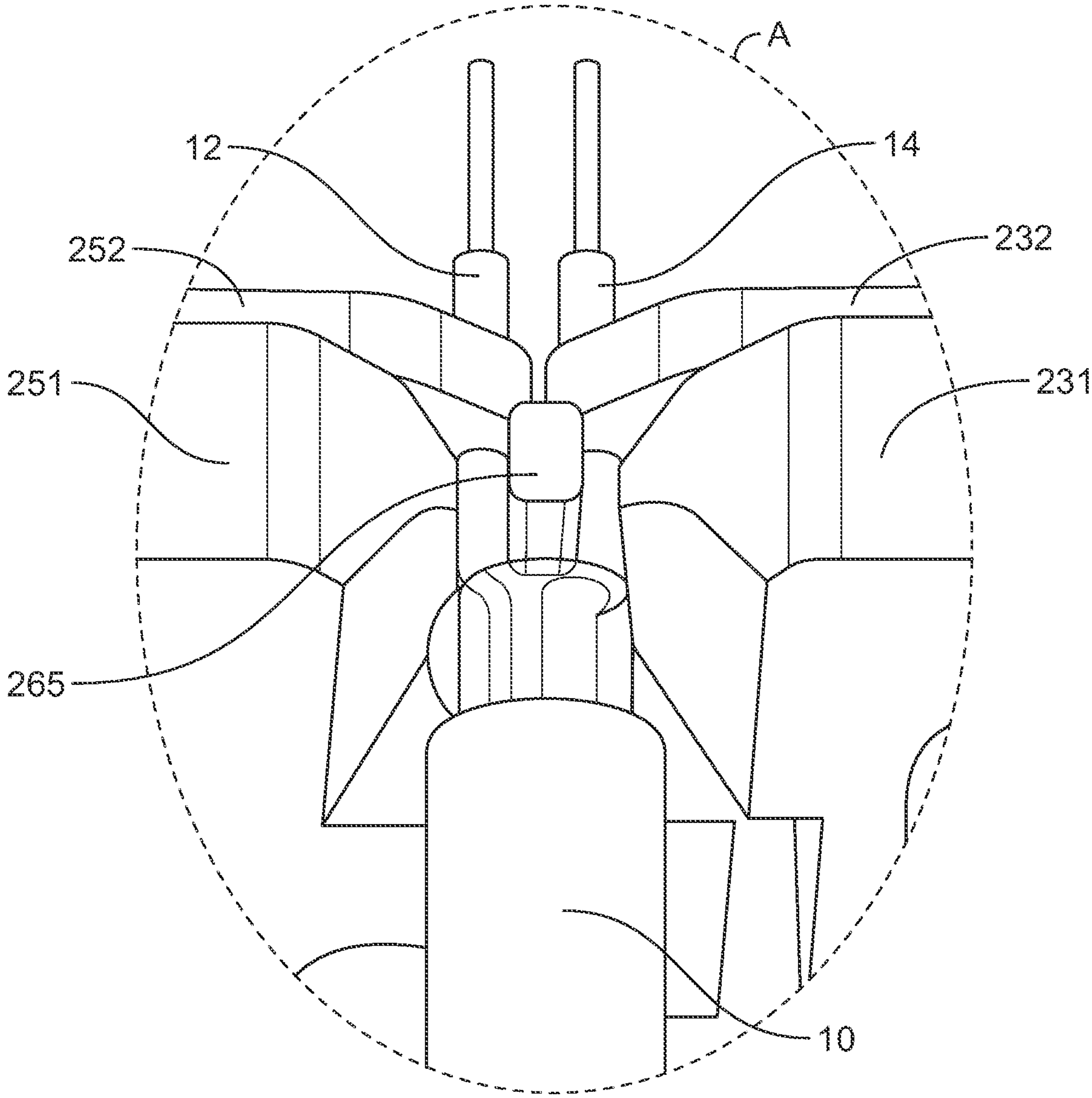
FIG. 3B is a partial top perspective view of the wire positioning device of FIG. 3A.

Referring generally to FIGS. 1 and 2, embodiments of the present disclosure will be described in use with an exemplary crimping system 100. The crimping system 100 generally includes an applicator or applicator assembly 110, a ram assembly 120, a terminal shear 130 and opposing crimping tooling or dies 141,142. The system 100 is adapted to crimp a terminal 152 sheared from a terminal strip or carrier 150 including a plurality of interconnected terminals onto the end(s) of a wire or cable. Specifically, the terminal applicator 110 is adapted to feed a terminal 152 of the terminal strip 150 into a crimping position between a movable upper crimping die 141 and an opposing stationary lower die 142. In the embodiment to be discussed, the terminal strip 150 is to the front of the terminals 152. However, an alternate embodiment with the carrier strip 150 to the rear of the terminals 152 is also possible. The upper crimping die 141 is fixedly connected to a movable end of an applicator ram 122. The crimping system 100 may include, for example, one or more pneumatic or hydraulic cylinders or a motor-driven mechanism for selectively moving the ram assembly 120, including the applicator ram 122 and its mounted crimping die 141 in the vertical direction(s). During a termination sequence, the ram assembly 120 is lowered to separate the terminal 152 from the strip 150 via the terminal shear 130, and crimp the terminal 152 onto a free end of the wire or cable inserted therein via the crimping dies 141,142. If the terminal shear is to the rear of the anvil, as it would be for a rear carrier strip embodiment (not shown), the present invention can be positioned much closer to the crimp dies 141,142 in order to maintain the shortest possible wire breakout length. Alternatively, the invention can be used with a front carrier strip and front strip shear and longer wire breakout as shown. As shown specifically in FIG. 2, a portion of a wire processing or positioning device or assembly 200 according to an embodiment of the present disclosure is shown orienting a wire 12 of a pair of wires 12,14 of a cable 10 in a crimping position between the above-described upper and lower crimping dies 141,142. As shown, the positioning device 200 biases or displaces the other wire 14 out of a crimping zone. Preferably, the biasing or displacement of the wire is not done to an extent that permanently deforms the wire.

Figure 4:
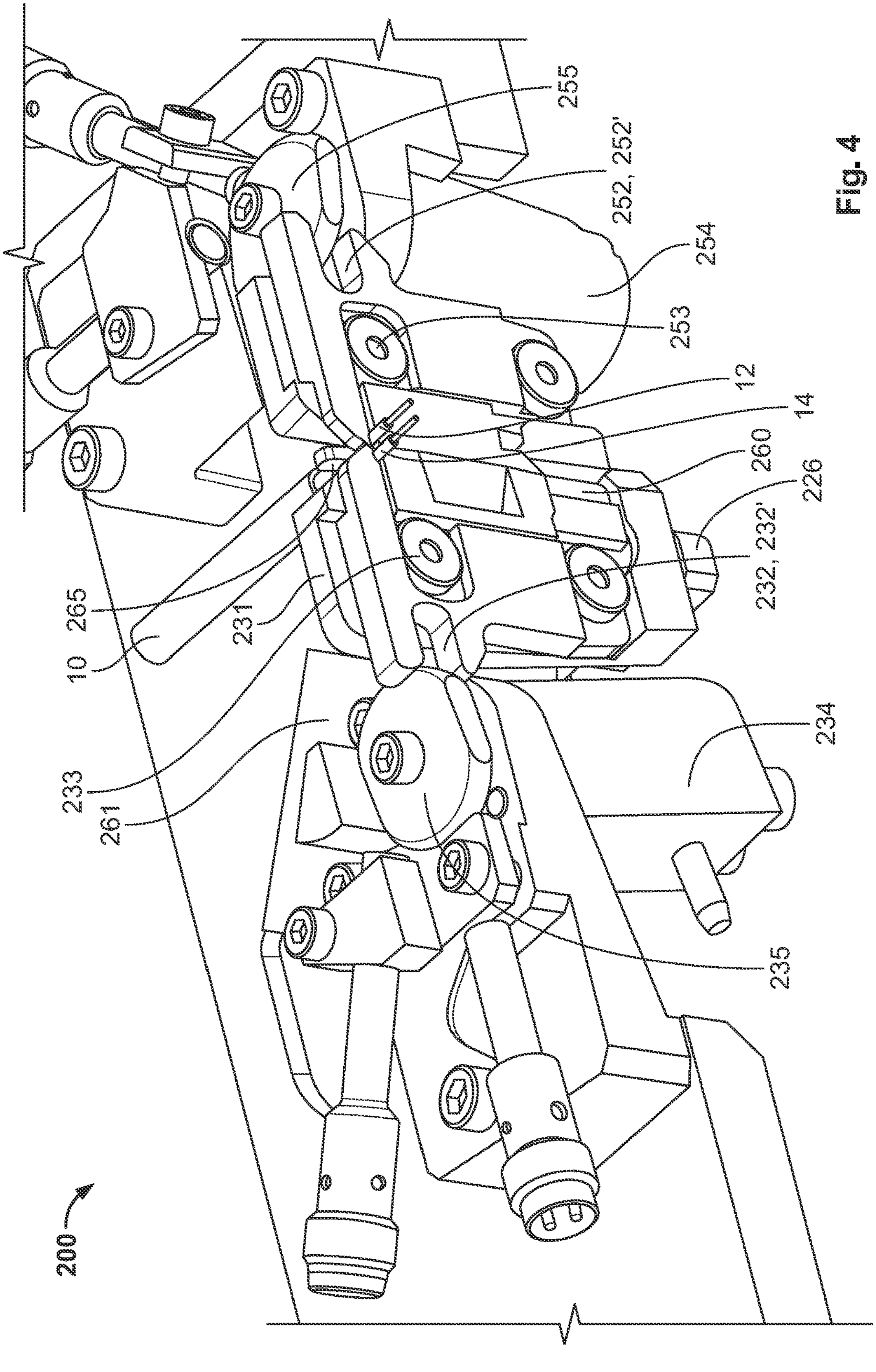
FIG. 4 is a front perspective view of the wire positioning device of the preceding figures.
Figure 5:
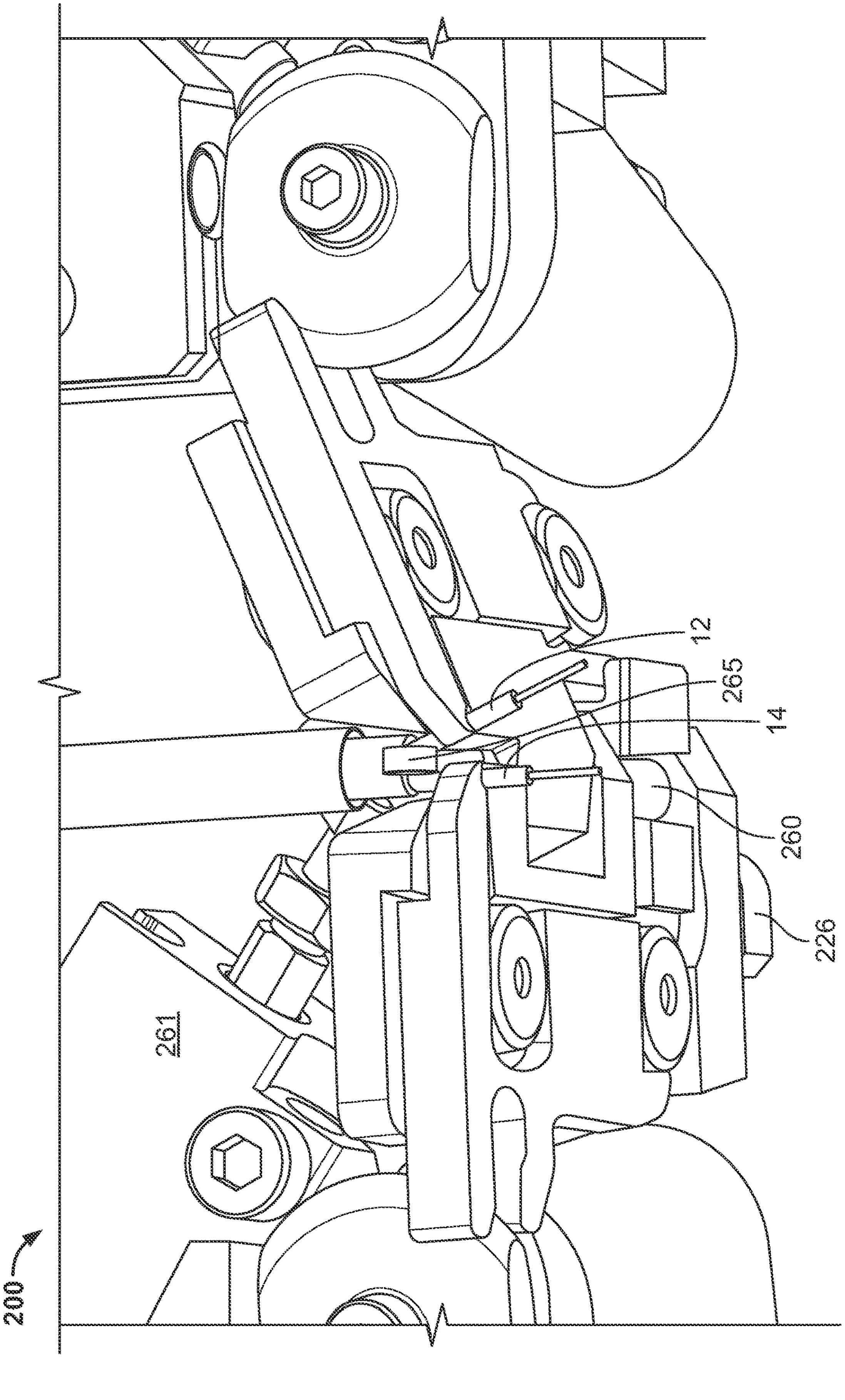
FIG. 5 is another top perspective view of the wire positioning device of the preceding figures.
Figure 6:
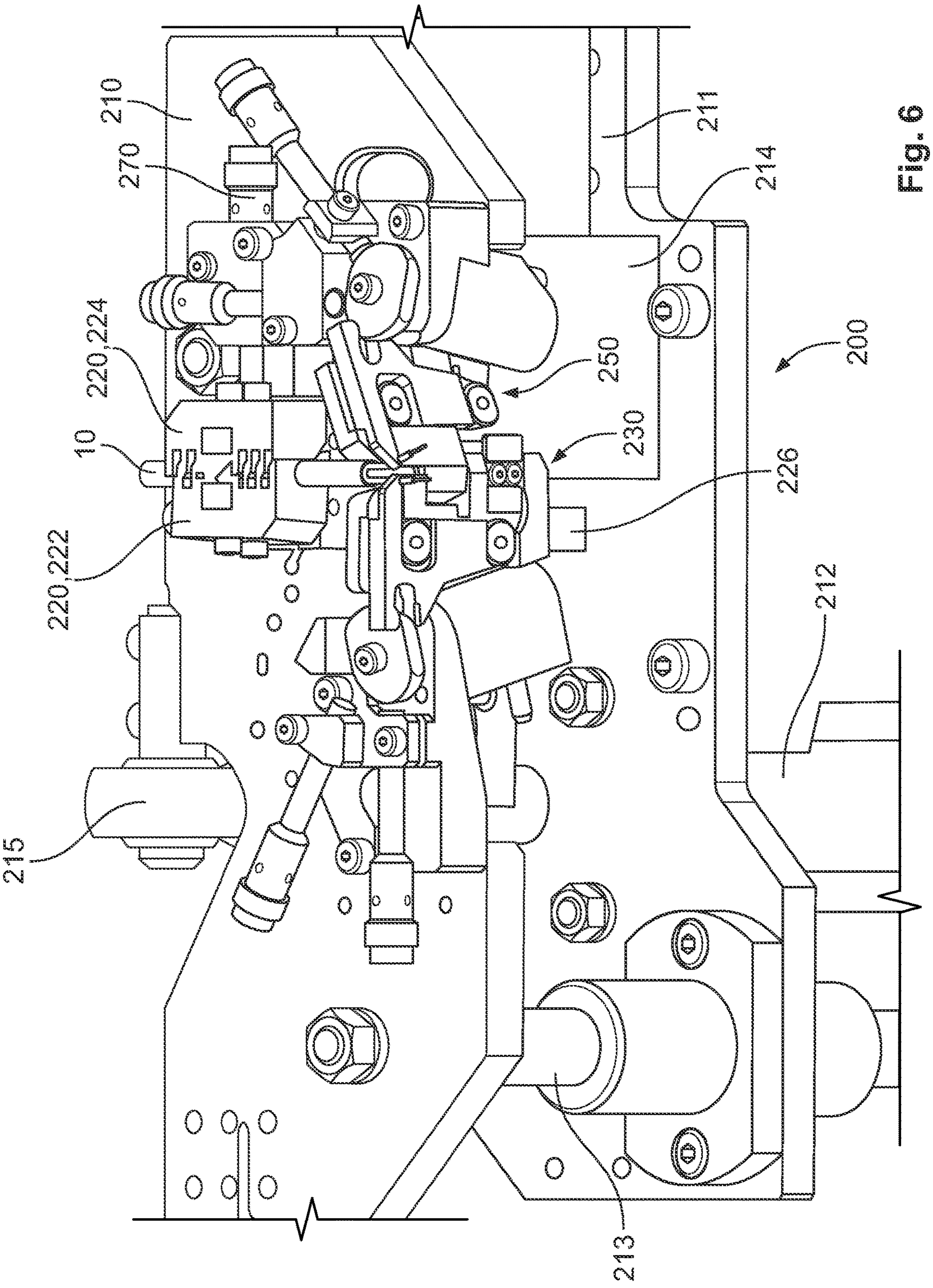
FIG. 6 is another front perspective view of the wire positioning device of the preceding figures.
Figure 7:
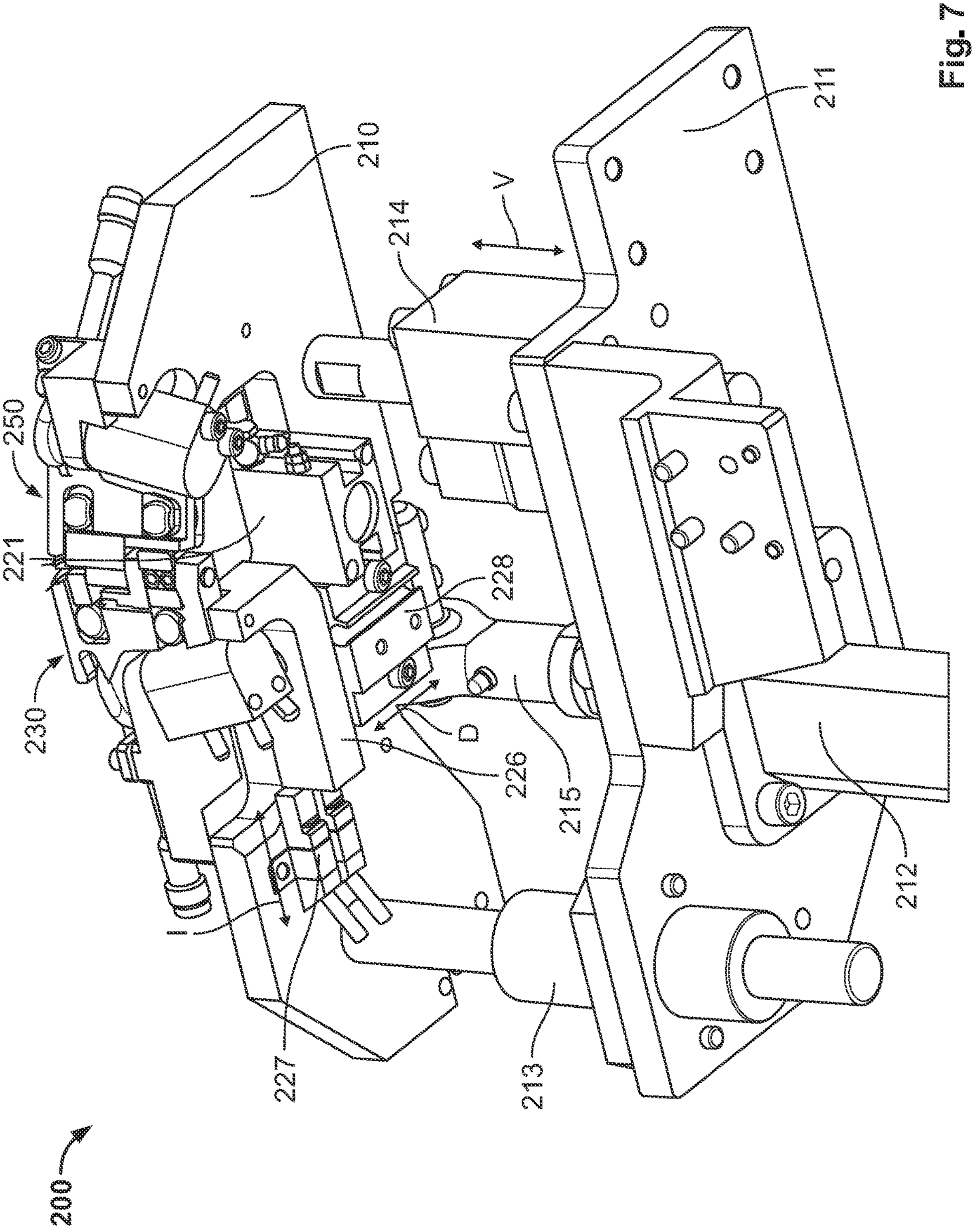
FIG. 7 is a bottom perspective view of the wire positioning device of the preceding figures.

Referring generally to FIGS. 3A-7, and particularly FIGS. 6 and 7, the wire positioning assembly 200 includes a movable first base or platform 210, and a moveable second base or platform 211. The base 210 may be movable, for example, in vertical directions V with respect to platform 211 via at least one actuator 212 (e.g., a linear actuator). Additional linear supports or guides 213,214 may be provided between the bases 210,211 for improving stability and translational accuracy. In one embodiment, a rod eye 215 is utilized to connect the actuator 212 between the bases 210 and 211. The movable base 211 may be moved in the I and D directions in the plane normal to the V direction by actuators and mechanism not shown.

As shown in FIG. 6, a cable clamp 220 may be mounted to the base 210 and adapted to selectively grip the cable 10 therein for processing. An actuator 221 (e.g., a pneumatic gripper, see FIG. 7) is adapted to operate the clamp 220. Specifically, the clamp 220 includes a first clamp half 222 pivotally connected to a second clamp half 224. The actuator 221 is adapted to selectively rotate the second half 224 relative to the first half 222 for fixing the cable 10 within the illustrated opening therebetween. The cable clamp 220 has been removed from FIGS. 3A-5 for the purposes of clarity.

As most clearly shown in FIGS. 3A-5, a first gripper or clamp assembly 230 includes a fixed member 231, and a movable member 232. The movable member 232 is moveable in cam slots relative to the fixed member 231 as guided by pins 233 (see FIG. 4). A linear actuator 234 is operative with a cam 235 attached thereto to articulate the movable member 232 relative to the fixed member 231. Specifically, the cam 235 engages with a corresponding cam surface or slot 232' of the movable member 232 to displace the member relative to the fixed member 231, and selectively clamp an individual wire 14 of the cable 10 between opposing clamping surfaces thereof. The motion between the members 231,232 may be enabled by the linear position of the cam 235 and as driven by actuator 234 relative to the slot 232'.

Likewise, a second gripper or clamp assembly 250 includes a fixed member 251 and a movable member 252. As with the first clamp 230, the movable member 252 is moveable in cam slots relative to the fixed member 251 as guided by pins 253. A linear actuator 254 is operative with a cam 255 attached thereto to articulate the movable member 252 relative to the fixed member 251. The cam 255 engages with a corresponding cam surface or slot 252' of the movable member 252 to move the member relative to the fixed member 251, and selectively clamp the wire 12 between opposing clamping surfaces thereof. While the use of linear actuators are shown for enabling the selective gripping of each of the wires 12,14, other types of actuators may be used in a similar manner (e.g., rotary actuators) without departing from the scope of the present disclosure.

The second gripper or assembly 250 is pivotally connected to the first gripper 230 via, for example, a connection pin 260 extending through each of the fixed members 231,251. A linear actuator 261 is provided for selectively rotating the second gripper 250 relative to the first gripper 230. In one embodiment, a movable end of the actuator 261 is connected to the fixed member 251, although other arrangements for achieving relative rotation between the assemblies are also envisioned. The rotation between the assemblies 230,250 selectively spreads or separates the wires 12,14 of the cable 10, as shown in FIGS. 4 and 5. In this way, one of the two wires (e.g., the wire 14 in FIG. 5) may be inserted into a crimping position within the applicator assembly 110, with the other wire (e.g. wire 12 in FIG. 5) temporarily moved out of the crimping area so as to not interfere with associated processing or crimping tooling. In one embodiment, a wire spreading pin or protrusion 265 extends from between the assemblies 230,250 and is operative to maintain a desired separation distance between the wires 12,14 of the cable 10. The pin 265 may be formed integrally with the connection pin 260 arranged between the first and second fixed members 231,251.

As shown in FIG. 7, the assembly 230 may be pivotally engaged with the bracket 226. The bracket 226 may be movably mounted to the base 210. Specifically, the bracket 226 may be movable or slidable relative to the base 210 in at least one direction. In the exemplary embodiment, the bracket 226 is movable in forward/backward directions D (i.e., an axial insertion direction of the wire into a terminal) via linear actuator 228. A pair of sensors 227 are provided for detecting this motion in the insertion direction D. Motion of the wire positioning assembly 200 in an indexing or lateral direction I may be achieved by translating the bases 210,211 via a linear actuator, by way of example only.

Control of each of the actuators described herein, may be programmable in nature (i.e., under the control of at least one processor and associated memory devices), as would be understood by one of ordinary skill in the art. This control is enabled by a plurality of position sensors for detecting the state or position of each for the actuators set forth herein. For example, a plurality of sensors 270 are provided for monitoring and/or controlling the position of, for example, the cams 235,255 and the cable clamp 220, as shown in FIGS. 4 and 6. A control system including these sensors may be used to automate the operation of the above-described system (e.g., the motion of each of the actuators). In this way, the system according to embodiments of the present disclosure may be used in conjunction with a terminal applicator to perform cable or wire termination operations under computer control without operator input. Further details of this control system are omitted herein in the interest of brevity.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A wire holding device, comprising:
a base;
a clamping assembly, including:
a first gripper attached to the base and adapted to grip a first wire of a cable; and
a second gripper adapted to grip a second wire of the cable, the second gripper movable relative to, and operable independently of, the first gripper, the second gripper is pivotally mounted to the first gripper about an axis perpendicular to a central axis of the cable, the first and second grippers are movable with the base in a vertical direction;
a bracket, the base and the first gripper attached to the bracket; and
a first actuator for moving the bracket in an insertion direction perpendicular to the vertical direction.

2. The wire holding device of claim 1, wherein the second gripper is rotatable relative to the first gripper by at least 20 degrees.

3. The wire holding device of claim 1, further comprising a wire separating actuator rotating the second gripper relative to the first gripper.

4. The wire holding device of claim 1, wherein the first actuator comprises a linear actuator mounted between the base and the bracket.

5. The wire holding device of claim 1, wherein the base is movable along a vertical axis with respect to a platform.

6. The wire holding device of claim 1, wherein each gripper includes opposable clamping members, at least one of the clamping members is movable relative to the other one of the clamping members for independently gripping a respective one of the first and second wires of the cable.

7. The wire holding device of claim 6, wherein each gripper includes a gripping actuator operative to bias at least one of the opposing clamping members relative to the other of the clamping members.

8. The wire holding device of claim 7, wherein each gripping actuator comprises a linear actuator having an end fixedly attached to a cam, the cam engaging with a surface of at least one of the clamping members.

9. The wire holding device of claim 1, further comprising a protrusion extending between the first and second grippers in a direction perpendicular to a central axis of the cable and sized to be arranged between and separate the first and second wires of the cable.

10. The wire holding device of claim 1, further comprising a cable clamp for selectively clamping the cable in position relative to the clamping assembly.

11. The wire holding device of claim 1, wherein the clamping assembly is independently movable along three mutually perpendicular axes.

12. A wire holding device, comprising:
a base; and
a clamping assembly, including:
a first gripper attached to the base and adapted to grip a first wire of a cable; and
a second gripper adapted to grip a second wire of the cable, the second gripper movable relative to, and operable independently of, the first gripper;
each gripper including:
opposable clamping members, at least one of the clamping members is movable relative to the other one of the clamping members for independently gripping a respective one of the first and second wires of the cable; and
a gripping actuator operative to bias at least one of the opposing clamping members relative to the other of the clamping members, each gripping actuator comprises a linear actuator having an end fixedly attached to a cam, the cam engaging with a surface of at least one of the clamping members.

* * * * *